United States Patent [19]

Hiraiwa et al.

[11] Patent Number: 4,980,086

[45] Date of Patent: Dec. 25, 1990

[54] CURABLE COMPOSITION

[75] Inventors: Akihiko Hiraiwa; Kaoru Kimura; Mitsuyoshi Sato, all of Nagoya, Japan

[73] Assignee: Toagosei Chemical Industry, Co., Ltd., Tokyo, Japan

[21] Appl. No.: 469,674

[22] Filed: Jan. 24, 1990

Related U.S. Application Data

[63] Continuation of Ser. No. 916,524, Oct. 8, 1986, abandoned.

[30] Foreign Application Priority Data

Oct. 16, 1985 [JP] Japan .................................. 60-228808
Oct. 26, 1985 [JP] Japan .................................. 60-238608

[51] Int. Cl.$^5$ ............................................. H01B 1/06
[52] U.S. Cl. ..................................... 252/511; 252/503; 252/512; 252/513; 252/514; 252/518; 252/520; 252/500; 252/521; 252/62.3 T; 524/439; 524/440; 524/441; 524/451; 524/445; 524/157; 524/165; 524/183; 524/404; 524/412; 524/415; 524/377
[58] Field of Search ............... 252/511, 500, 502, 503, 252/504, 512, 513, 514, 516, 518, 520, 521, 62.3 T; 524/495, 496, 401, 439, 404, 444, 445, 412, 415, 409, 411, 414, 157, 158, 165, 183, 377, 378, 184

[56] References Cited

U.S. PATENT DOCUMENTS

| | | | |
|---|---|---|---|
| 3,557,185 | 1/1971 | Ito et al. | 260/465.4 |
| 3,652,635 | 3/1972 | Kawamura et al. | 260/164 |
| 3,699,076 | 10/1972 | Thomsen et al. | 260/41 C |
| 3,742,018 | 6/1973 | O'Sullivan | 260/465.4 |
| 3,836,565 | 9/1974 | Brinkmann et al. | 260/464 |
| 4,378,457 | 3/1983 | Gruber et al. | 526/285 |

FOREIGN PATENT DOCUMENTS

| | | |
|---|---|---|
| 4235992 | 11/1970 | Japan . |
| 4222794 | 10/1971 | Japan . |
| 141827 | 5/1979 | Japan . |
| 535623 | 3/1980 | Japan . |
| 173813 | 6/1985 | Japan . |
| 199084 | 10/1985 | Japan . |

Primary Examiner—Josephine Barr
Attorney, Agent, or Firm—Wyatt, Gerber, Burke and Badie

[57] ABSTRACT

A curable composition, in which powder of an organic or inorganic compound is added to and dispersed in a 2-cyanoacrylate and an acidic substance and a basic substance are contained as the stabilizer.

In the curable composition of the invention, powder of organic or inorganic compound can be stably dispersed into the composition by the combined use of the acidic substance and the basic substance, thereby providing desired properties with ease while giving excellent storage stability and maintaining the instantaneous curing property of the composition. The curable composition can generally be used as adhesives, coating agents, paints, potting agents, etc.

6 Claims, No Drawings

CURABLE COMPOSITION

This is a continuation of 06/916,524 filed Oct. 8, 1986, now abandoned.

BACKGROUND OF THE INVENTION

1. Field of the Invention

This invention relates curable compositions and, more specifically, compositions containing 2-cyanoacrylic acid esters which are main ingredients of 2-cyanoacrylic ester type instant curing adhesives utilized broadly for bonding, repairing and covering of products in various field of industries. Curable composition can be utilized in those fields of industries where such instant adhesives have been used broadly, as well as in beauty parlor or like other service area and further in home uses.

2. Description of Related Art Including Information Disclosed under 1.97–1.99

Upon contact with the moisture in the atmosphere or a trace quantity of water adsorbed to the surface of a material to be coated with adhesives, 2-cyanoacrylic acid esters rapidly polymerize to cure and show excellent adhesive performance under ambient temperature and, accordingly, they have been widely used for instant adhesiveness for the bonding of plastic, rubber, glass and metal.

Meanwhile, various attempts have been made for the addition of powdered organic or inorganic compounds in order to improve the properties of curing products of 2-cyanoacrylic acid esters to increase the number of uses of adhesives and also of paints and coating or potting agents by utilizing the above-mentioned properties of 2-cyanoacrylic acid ester.

For instance, it has been attempted to utilize the instant curing property of 2-cyanoacrylic acid esters as electroconductive adhesives, or as substitutes for soldering and electroconductive paints for use in the fixing of lead wires to contacts, manufacturing of circuits or painting for electromagnetic wave shields in electronic or electrical industries by the addition of electroconductive powder to 2-cyanoacrylic acid ester.

Further, attempts have been made to add a pigmenting agent, for coloration, to 2-cyanoacrylic acid ester to facilitate the identification of various kinds of adhesives thereby preventing errors in coating them and, further, utilize them as paints and, particularly, rapid curing paint (refer to Japanese Patent Publication No. Sho 46-35250, Japanese Patent Laid-Open No. Sho 52-65531 and Japanese Patent Publication No. Sho 55-11685).

Furthermore, it has also been tried to add various kinds of powders of high polymers or inorganic compounds in order to improve the peeling-strength and impact shocks which are important as the properties of the adhesives (refer to Japanese Patent Laid-Open No. Sho 60-199084).

However, the instantaneous curing property of 2-cyanoacrylate esters improves as the purity and such improves instantaneous curability is reduced as additives are added. Further, the storage stability often becomes poor. Accordingly, it has been extremely difficult and rarely successful to improve the properties of 2-cyanoacrylic acid ester by adding additives.

While on the other hand, various kinds of stabilizers have been studied for providing satisfactory storage stability without damaging the instantaneous curability of 2-cyanoacrylic acid ester. For such stabilizers, there have been proposed, for example, acidic gases such as $SO_2$, NO and HF or solid acids such as phosphor pentoxide, antimony pentoxide, picric acid and ferric chloride (refer to U.S. Pat. Nos. 2,467,926, 2,467,927, 2,721,858, 2,756,251, 2,763,677, 2,765,332 and 2,794,788), phosphor pentoxide, acetic acid, acrylic acid, methacrylic acid, itaconic acid, $SnCl_4$, complex salts of boron trifluoride with ether, carboxylic acids, ketones and other similar oxygen atom-containing compounds, ferric chloride and other Lewis acids (refer to U.S. Pat. Nos. 2,912,454 and 2,926,188), anhydrous sulfuric acid or benzene sulfinic acid (Japanese Patent Publication No. Sho 45-2010), sulfuryl chloride (Japanese Patent Publication No. Sho 45-35291), sultone (Japanese Patent Publication No. Sho 45-41520, 47-50213), aromatic sulfonic acid (Japanese Patent Publication Nos. Sho 46-13729, 48-10379, British Patent No. 1301645 and U.S. Pat. No. 3,652,635), non-volatile acid with pKa less than 3 (Japanese Patent Publication No. Sho 46-37278), combination of aromatic sulfonic acid with acidic gas such as $SO_2$, NO and HF (Japanese Patent Publication Nos. Sho 48-13334 and 48-16904), boron trifluoride—phenol complex salt, boron trifluoride—carboxylic acid complex salt, boron trifluoride—ether complex salt (Japanese Patent Publication No. Sho 56-52949), trichloro acetic acid (Japanese Patent Laid-Open No. Sho 49-31619), oxonium compounds and phosphonium compounds (Japanese Patent Publication No. Sho 56-53593), etc. as well as various other compounds.

The present inventors have made various studies of stabilizers, including those as described above, capable of attaining satisfactory storage stability of curable compositions, in which organic or inorganic powder is added and dispersed in order to improve the properties of 2-cyanoacrylic acid esters, without damaging the instantaneous curability thereof and have accomplished this invention based on the findings that the foregoing purpose can be attained by the combination of specific stabilizers, that is, by the combined use of an acidic substance and a basic substance as the stabilizer.

SUMMARY OF THE INVENTION

The foregoing object can be attained in accordance with this invention by a curable composition in which a powder of an organic or inorganic compound is added and dispersed in 2-cyanoacrylic acid ester and an acidic substance and a basic substance are contained as a stabilizer.

DETAILED DESCRIPTION OF THE INVENTION

2-cyanoacrylic acid ester 2-cyanoacrylic acid esters (hereinafter referred to as 2-cyanoacrylate) used in this invention are used as the main ingredient for cyanoacrylate type adhesives which have been generally used as rapidly or instantaneous curing adhesives (hereinafter referred to as instant adhesives).

"The 2-cyanoacrylates useful in this invention" include the following esters which can be used alone or in combinations containing two or more methyl, ethyl, chloroethyl, n-propyl, i-propyl, allyl, propargyl, n-butyl, i-butyl t-butyl, n-pentyl, n-hexyl, cyclohexyl, phenyl, tetrahydrofurfuryl, heptyl, 2-ethylhexyl, n-octyl, nonyl, oxononyl, decyl, n-dodecyl, ethoxyethyl, 3-methoxybutyl, ethoxyethoxyethyl, trifluoroethyl, hexafluoroisopropyl and the like.

Powder of organic or inorganic compounds

The powder of organic or inorganic compounds added and dispersed for improving the properties of 2-cyanoacrylate can include, for example, electroconductive powder, pigment powder, heat conductive powder, flame retardant powder, high polymer powder and like other additive powder, and they specifically include the types of compounds mentioned below. The powder may be in the form of particulates, filaments, whiskers and the like.

Electroconductive powder

Electroconductive powders of various compounds of silver, copper, nickel, aluminum, gold, palladium, platinum, ruthenium and graphite, as well as composite powder containing them can be employed.

For improving the 2-cyanoacrylate with the electroconductive powders, it is desired that the amount of powder be from 10 to 400 parts by weight and, more preferably, from 100 to 300 parts by weight based on 100 parts by weight of 2-cyanoacrylate. If the ratio exceeds 400 parts by weight, the storage stability and the bonding strength of the composition may be reduced to impair the bonding performance. While on the other hand, insufficient electroconductivity can be attained with less than 10 parts by weight.

Pigment powder

The pigment powder can include those employed generally as pigments. These include inorganic pigments, for example, powder of titanium oxide, zinc powder, lithopone, white lead, cadmium yellow, yellow lead, chrome vermilion, Chrome Orange, loess, amber, red iron oxide, yellow iron oxide, cadmium red, red lead, prussian blue, ultramarine, cobalt blue, chromium oxide, carbon black and iron black; as well as organic pigments for example, Benzidine Yellow, Hanza Yellow G, Permanent Red 4G, Para Red, Phthalocyanine Blue, Aniline Black, Permanent Yellow HR, Violet BL, quinacridone and Fast Orange GRL, lake pigments, for example, Alizarine Lake, Pigment Scarlet, Brilliant Carmine 6B, Permanent Red F5R, Laked C, Rhodamine Lake B, Rhodamine Lake Y, Peacock Blue Lake, red No. 3 aluminum lake, yellow No. 5 aluminum lake, and blue No. 2 aluminum lake.

For pigmenting the 2-cyanoacrylate, it is desirable to add the above-mentioned powder in an amount from 0.001 to 30% by weight, preferably, from 0.05 to 5% by weight in the composition. If the addition amount exceeds 30% by weight, the storage stability and the strength after curing may be reduced. While on the other hand, the pigmentation of the composition is insufficient if the amount is less than 0.001% by weight.

Heat conductive powder

Heat conductive powders which improve the heat conductivity of the compositions include those powders of silicon nitride, aluminum nitride, boron nitride, titanium nitride, sialon, silicon carbide, aluminum carbide, boron carbide, titanium carbide, aluminum oxide, glass fibers, boron oxide, alumina, talc, silica, beryllia, clay, and powder of metals.

Flame retardant powder

The flame retardant powder useful in the invention include antimony pentoxide, antimony trioxide, aluminum hydroxide and red phosphor.

High polymer powder

The high polymer powders useful in the invention include powders of natural rubber, isoprene rubber, chloroprene rubber, butadiene rubber, acrylonitrile/butadiene rubber, styrene/butadiene rubber, urethane rubber, acryl rubber/acrylonitrile/styrene copolymer, EPDM rubber/acrylonitrile/styrene copolymer, acrylonitrile/styrene/butadiene copolymer, methylmethacrylate/acrylic rubber/styrene copolymer, methylmethacrylate/butadiene/styrene copolymer, methylmethacrylate/acrylic rubber/butadiene/styrene copolymer, polyethylene, polypropylene, polystyrene, polyvinyl chloride, polyester and polyamide.

Other additive powder

Other additive powders include powders of barium stearate, cadmium stearate, calcium stearate, lead stearate, aluminum stearate, barium laurate, barium.cadmium laurate, barium ricinoleate, cadmium ricinoleate, calcium ricinoleate, dibasic lead phosphite, tribasic lead sulfate, dibasic lead stearate, sodium phosphate and barium phosphate.

The amount of the heat conductivity providing powder or flame retardant powder to be added to the 2-cyanoacrylate is determined so that the desired properties, for example, heat conductivity or flame retardancy can be attained.

The amounts of high polymer powder or like other additive powder added to the 2-cyanoacrylate for improving the peeling resistance or impact shock to the joining portion of the joined materials bonded with 2-cyanoacrylate is from 0.01 to 20 parts by weight and, preferably, from 0.1 to 5 parts by weight based on 100 parts by weight of the 2-cyanoacrylate. If it exceeds 20 parts by weight, the storage stability of the composition may be impaired. While on the other hand, it is difficult to provide substantially satisfactory property with less than 0.01 parts by weight.

Treatment of powder

The powder of organic or inorganic compound used in this invention is preferably brought into contact with an acid or coupling agent (surface treating agent) and the effect intended in this invention can further be improved by such treated powder.

As the acid capable of improving the effect by being brought in contact with the powder, there can be mentioned protonic acids or anhydrides thereof and they can include, specifically, inorganic acids such as hydrochloric acid, sulfuric acid and phosphoric acid, as well as organic acids, organic acid anhydrides and organic acid esters containing acid groups as exemplified below.

The organic acid can include, for example, acetic acid, propionic acid, butyric acid, trifluoro acetic acid, valeric acid, hexanoic acid, malonic acid, succinic acid, glutaric acid, adipic acid, maleic acid, fumaric acid, cinnamic acid, benzoic acid, methane sulfonic acid, toluene sulfonic acid, trifluoromethane sulfonic acid, toluene disulfonic acid, itaconic acid, aconitic acid, phthalic acid and trimellitic acid. The organic acid anhydride can include, for example, acetic anhydride, propionic anhydride, butyric anhydride, valeric anhydride, succinic anhydride, glutaric anhydride, adipic anhydride, maleic anhydride, itaconic anhydride, aconitic anhydride, phthalic anhydride and trimellitic anhydride. The organic acid esters containing acid groups can include those compounds such as ethylene glycol ditrimellitate and trimethylene glycol ditrimellitate.

Preferred acids are organic acids such as toluene sulfonic acid or organic acid anhydride such as trimellitic anhydride.

As the coupling agent (surface treating agent), various kinds of agents may be applied and they can include, specifically,
β-(3,4)-epoxycyclohexylethyltrimethoxysilane,
α-chloropropyltrimethoxysilane,
γ-glycidoxypropyltrimethoxysilane,
vinyltriacetoxysilane, vinyltriethoxysilane,
vinyltrichlorosilane, vinyltris(2-methoxyethoxy)silane,
vinyltrimethoxysilane, γ-methacryloxypropyltrimethoxysilane,
ethyltrimethoxysilane, butyltrimethoxysilane,
octyltrimethoxysilane, phenyltrimethoxysilane,
dimethylsiloxane oil, hexamethylsilazane,
isopropyl isostearoyldiacryl titanate,
isopropyldimethacryl isostearoyl titanate,
isopropyl triisostearoyl titanate,
isopropyl trioctanoyl titanate,
isopropyl tricumyl phenyl titanate,
isopropyl tris(dioctylpyrophosphate)titanate,
isopropyl tri(dioctyl)titanate,
isopropyl tridecelbenzenesulfonyl titanate,
dicumyl phenyloxy acetate titanate,
diisostearoyl ethylene titanate,
tetraisopropyl bis(dioctyl phosphite)titanate,
tetraoctyl bis(ditridecylphosphite)titanate,
tetra(2,2-diallylmethyl-1-butyl)bis(di-tridecyl)phosphite titanate, bis(dioctylpyrophosphate) ethylene titanate and
bis(dioctylpyrophosphate) oxyacetate titanate.

In this invention, it is also possible to use those powders brought into contact with the acid and the coupling agents as described above simultaneously.

One method of bringing the powder for use in this invention into contact with the acid or the coupling agent is to immerse the powder in a solution of the selected acid or coupling agent. Another is to coat the powders with the solution. Since these compounds include strong acids or those which are solid at ambient temperature, it is preferred to use them as a solution in the dipping or coating step for simplicity of handling handling and to avoid damages to the powder.

The solvents for preparing the solution has no particular restrictions so long as they dissolve the above-mentioned compounds. The followings are preferred.

Water, aliphatic alcohols with less than 9 carbon atoms, for example, methanol, ethanol and cyclohexanol, ketones with less than 9 carbon atoms, for example, acetone and methyl ethyl ketone, esters of acids with less than 3 carbon atoms and alcohols with less than 7 carbon atoms, for example, ethyl acetate and butyl acetate, aliphatic ethers, for example, diethyl ether, tetrahydrofurane and dioxane, halogenated hydrocarbons, for example, chloroform, trichloroethane and trichlortrifluoroethane.

These solvents may be used alone or as a mixed solvent with no substantial difference in the effect of this invention.

The concentration of acids in the solution using the solvent as described above is desirably less than 20% by weight and, more preferably, from 0.5 to 5% by weight. The concentration of coupling agents in the solution using the solvent as described above is desirably less than 5% by weight and, more preferably, from 0.01 to 1% by weight.

As the method of bringing the powder into contact with the above-mentioned compound, that is, means for dipping the powder in the solution of the compound or coating the powder with the solution, conventional methods may be employed in which the powder is immersed in the solution for about one minute to about one hour or coating the solution by way of a spray gun or the like.

The powder immersed in the solution or coated with the solution is preferably removed with the excess solution by means of separation by filtration, separation by settling and centrifugal separation, etc. and further removed with the solvent by drying under ambient or reduced pressure at an ambient or elevated temperature.

Acidic substance

The acidic substances used in this invention are electron pair acceptors or coordination complexes thereof. They can include, for example, boron trifluoride and its derivatives, sulfonic acids, halogenated aliphatic carboxylic acids, antimony pentafluoride and phosphor hexafluoride. Specific compounds belonging to these respective groups are as follows.

Boron trifluoride and its derivatives

Boron trifluoride, boron trifluoride—acetic acid complex salt, boron trifluoride—formic acid complex salt, boron trifluoride—propionic acid complex salt, boron trifluoride—butyric acid complex salt, boron trifluoride—benzoic acid complex salt, boron trifluoride—methyl ether complex salt, boron trifluoride—ethyl ether complex salt, boron trifluoride—n-propyl ether complex salt, boron trifluoride—i-propylether complex salt, boron trifluoride—n-butyl ether complex salt, boron trifluoride—tetrahydrofuran complex salt, boron trifluoride—ethyl formate complex salt, boron trifluoride—methyl acetate complex salt, boron trifluoride—ethyl acetate complex salt, boron trifluoride—methanol complex salt, boron trifluoride—ethanol complex salt, boron trifluoride—butanol complex salt, boron trifluoride—ethylene glycol complex salt, boron trifluoride—trifluoroethanol complex salt, boron trifluoride—monoethylamine complex salt, boron trifluoride—phenol complex salt, boron trifluoride—cresol complex salt, boron trifluoride—catechol complex salt, boron trifluoride—hydroquinone complex salt, boron trifluoride—hydroquinone monomethyl ether complex salt, boron trifluoride—piperidine complex salt, boron trifluoride—benzonitrile complex salt, trifluoro boric acid, etc.

Sulfonic aid

Toluene sulfonic acid, trifluoromethane sulfonic acid, chlorosulfonic acid, fluorosulfonic acid, magic acid, 2-sulfone benzoic anhydride, etc.

Halogenated aliphatic carboxylic acids

Trifluoro acetic acid, trichloro acetic acid, dichloro acetic acid, etc.

Among the above-mentioned compounds particularly preferred in this invention are boron trifluoride and its derivatives such as boron trifluoride, boron trifluoride—acetic acid complex salt, boron trifluoride—ethyl ether complex salt, baron fluoride—methanol complex salt, boron trifluoride—phenol complex salt, as well as sulfonic acids such as toluene sulfonic acid, trifluoromethane sulfonic acid, chlorosulfonic acid and fluorosulfonic acid. Particularly preferred compounds are boron trifluoride—acetic acid complex salt, boron trifluoride—ethyl ether complex salt, toluene sulfonic acid, trifluoromethane sulfonic acid and chlorosulfonic acid.

Blending amount

The amount of the acidic substance in the composition according to this invention is from 10 to 50000 ppm and, preferably, from 100 to 5000 ppm relative to 2-cyanoacrylate present in the composition. If the amount is less than 10 ppm, it is difficult to maintain stability of the powder in the composition. While on the other hand, if the amount exceeds 50000 ppm, the curing rate of the composition is retarded and instantaneous curablity cannot be expected.

Basic substance

The basic substances used in this invention are electron donors including amines, crown ethers, polyalkylene glycols and their derivative, aliphatic acid amides and the likes. Specific compounds are as follows.

Amines

Triethylamine, triethanolamine, aniline, N,N-dimethylaniline, N,N-diethylaniline, toluidine, N,N-dimethyltoluidine, N,N-diethyltoluidine, polyvinylpyridine, polyvinylcarbazole, polyvinylpyrrolidone and the like.

Crown ethers 18-crown-6, 15-crown-5, 12-crown-4, 1,1-dimethylsila-11-crown-4, 1,1-dimethylsila-14-crown-5, 1,1-dimethylsila-17-crown-6, keto-11-crown-4, keto-14-crown-5, keto-17-crown-6, 1-methylphosphono-11-crown-4, 1-ethylphosphono-11-crown-4, 1-phenyl-11-crown-4, 1-methylphosphono-14-crown-5, 1-ethylphosphono-14-crown-5, 1-phenyl-14-crown-5, 1-methylphosphono-17-crown-6, 1-ethylphosphono-17-crown-6, 1-phenylphosphono-17-crown-6 and the like.

Polyalkylene glycols and derivatives

Polyethylene glycol, polyethylene glycol methyl ether, polyethylene glycol ethyl ether, polyethylene glycol acrylate, polyethylene glycol methacrylate, polypropylene glycol, amylphenol.decaethylene glycol, p-isooctylphenol.decaethylene glycol, polyethylene glycol 400 monolaurate, polyethylene glycol oleate, polyethylene glycol tall oil ester, polyethylene glycol sorbitan monolaurate, alkylpolyethylene glycol thioether, oleylpolyethylene glycol ether, ethylene glycol—propylene glycol block copolymer, (polyoxyethylene)-polysilanolate, (polyoxypropylene)polysilanolate, (polyoxyisoprene)polysilanolate, (polyoxytetramethylene)-polysilanolate, (plyoxyethylene/succinic acid)polyester, (polyoxypropylene/succinic acid)polyester, (polyoxyisoprene/succinic acid)polyester, (polyoxytetramethylene/succinic acid)polyester, (polyoxyethylene/malonic acid)polyester, (polyoxypropylene/malonic acid)polyester, (polyoxyisoprene/malonic acid)polyester, (polyoxytetramethylene/malonic acid)-polyester, (polyoxyethylene/phthalic acid)polyester, (polyoxypropylene/phthalic acid)polyester, (polyoxyisoprene/phthalic acid)polyester, (polyoxytetramethylene/phthalic acid)polyester, (polyoxyethylene)polycarbonate, (polyoxyethylene)polyphosphate, (polyoxypropylene)polyphosphate, (polyoxyisoprene)polyphosphate, (polyoxytetramethylene)polyphosphate, (polyoxyethylene)polyphosphonate and the like.

These compounds, when represents by the chemical formula, have the repeating structure therein shown by the following formula:

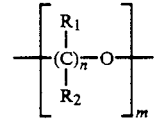

where $R_1$ and $R_2$, which may be identical or different represent hydrogen atom, substituted or a non-substituted alkyl group, alkenyl group, aryl group, aralkyl group, halogen atom or hydroxy group, n is an inter of 1 or greater, m is an integer of 2 or greater.

n in the formula means the repeating unit of the carbon main chain in the main skelton. In the case where n=1, the skelton is methylene or substituted methylene group and corresponds, for example, to formaldehyde condensate products, acetaldehyde condensate products or the like. In the case where n=2, the skelton is ethylene or a substituted ethylene group, corresponding specifically, for example, to those compounds having the skelton of ethylene, 1,2-propylene, chloroethylene, 2-chlororoethylene-ethylene, all of which may be used. In the case where n=3, the skelton is trimethylene or substituted trimethylene group and specific compounds usable herein can include, for example, those having the skelton of 1,3-propylene, 2,2,-dichloromethyl-propyl and the like. In the case where n=4, the skelton is tetramethylene or substituted tetramethylene group. In the case where n=5 or greater, corresponding compounds are present in the same way as described above, all which can be used. The compounds preferred in this invention are those in which n is from 2 to 6.

Then, m in the formula represents the repeating unit of polyether and those in which m is an integer of 2 or greater can be used in this invention. In a specific example of ethylene glycol where $R_1$ and $R_2$ represent hydrogen and n=2, the compound is diethylene glycol for m=2, triethylene glycol for m=3, tetraethylene glycol for m=4 and polyethylene glycols of various molecular weights for m=5 or greater. Those preferred in this invention are compounds in which m is less than 10,000, more preferably, from 4 to 3,000.

Fatty acid amides

Lauric acid monoethanolamide, lauric acid diethanolamide, coconut oil fatty acid monoethanolamide, coconut oil fatty acid diethanolamide, capryl acid ethanolamide, capric acid diethanolamide, myristic acid ethanolamide, palmitic acid ethanolamide, stearic acid ethanolamide, capryl acid isopropanolamide, capric acid isopropanolamide, myristic acid isopropanolamide, palmitic acid isopropanolamide and stearic acid isopropanolamide.

Among the above-mentioned compounds, those preferred in this invention are crown ether and polyalkylene glycol, as well as derivatives thereof. More preferred compounds are polyethylene glycol ethyl ether, polypropylene glycol, polyethylene glycol 400 monolaurate, polyethylene glycol oleate and alkyl polyethylene glycol thioether. Most preferred compounds are 18-crown-6, polyethylene glycol, polyethylene glycol methyl ether, polyethylene glycol acrylate, polyethylene glycol methacrylate, ethylene glycol—propylene glycol block copolymer and oleylpolyethylene glycol ether.

As described below, although it has been known that these compounds are used for improving the curing rate, etc. of 2-cyanoacrylate, the present inventors have for the first time found the excellent effect that the abovementioned compounds can stably disperse the powders of organic or inorganic compounds in 2-cyanoacrylate without impairing the instantaneous curing property of the 2-cyanoacrylate used in combination with the beforementioned acidic substance.

"The sources of some of the compounds of this invention are as follows:" Polyalkyleneoxide and esters and ethers thereof (U.S. Pat. No. 4,170,585), crown ethers (U.S. Pat. No. 4,171,416), normal or acidic salt or amine or imine (Japanese Patent Laid-Open No. Sho 54-141827), polyethylene glycol dimethacryl ester (Japanese Patent Laid-Open No. Sho 57-200469), monoacrylate of polyethylene/propyleneoxide (Japanese Patent Publication No. Sho 60-26513), polyether and its derivative (U.S. Pat. Nos. 4,307,216 and 4,377,490).

Blending amounts

The amount of the basic substance in the composition according to this invention is, preferably, 10 to 50,000 ppm and, preferably, from 100 to 5000 ppm based on 2-cyanoacrylate present in the composition. If the amount is less than 10 ppm, the curing rate of the composition is reduced and no instantaneous curability can be expected. While on the other hand, if it exceeds 50,000 ppm, it becomes difficult to stabilize the powder in the composition. Thus, neither of the cases are not preferred since the property as the curing composition may possibly be hindered.

Referring to the ratio of the acidic substance and the basic substance in the composition according to this invention, it is preferred that they are used, generally, in an equimolar amount or with a slight excess of the acidic substance, although some variations are tolerable dependent on the respective substances, by which a composition excellent in the storage stability and curing rate can be attained, which is the object of this invention.

Methods of Preparation

Composition according to this invention can be prepared by merely mixing the ingredients. However, in view of the stability of 2-cyanoacrylate, a method of adding and mixing the acidic substance, basic substance and powder in this sequence to 2-cyanoacrylate is preferred. When the acidic substance and basic substance are mixed alone, they partially or entirely form a complex salt and the effect as the purpose of this invention can sufficiently be attained by using them in such a form.

As has been described above, it is also possible to use commercially available cyanoacrylate type adhesives as the 2-cyanoacrylate, and stabilizer, viscosity improver, plasticizer and crosslinker, etc., which are usually added to the cyanoacrylate type adhesives, may also be added to the composition according to this invention. The stabilizer include, for example, $SO_2$, sultone, lactone, hydroquinone, hydroquinonemonomethyl ether, catechol and pyrrogarol, which is added by an amount from 1 to 1000 ppm to 2-cyanoacrylate. The viscosity improver can include polymer such as methylmethacrylate polymer, 2-cyanoacrylate polymer and acrylic rubber of which several percent may be added. The plasticizer can include dioctylphthalate, sebacic acid ester, phosphoric acid ester and the like. The crosslinker can include, for example, polyfunctional vinyl monomers such as alkylene diacrylate, alkylenedimethacrylate, trimethlolpropane triacrylate and triallyl isocyanurate. Further, thixotropy agent such as fumed silica may be added up to several percent depending on the case for improving the viscosity and providing a thixotropic property.

In the curable composition according to this invention, the acidic substance and the basic substance, in combination, give a certain effect to powder thereby enabling it to disperse stably into the composition, thus providing the desired properties. Additionally, the composition thus obtained is excellent in the storage stability and, the composition when coated on the surface of a material can maintain excellent instantaneous curability due to the moisture at the surface of the material or in the air.

Accordingly, the curable composition according to this invention is effective as adhesive, coating agent, paint and potting agent, etc., which can generally be used in various field of industries.

This invention will now be described more specifically referring to examples and comparative examples.

EXAMPLE 1

Chlorosulfonic acid, polyethylene glycol 1500 and polymethyl methacrylate were added to ethyl 2-cyanoacrylate in the blending ratio shown in Table 1, to which Fast Orange GRL (organic pigment) was further added and kneaded sufficiently at a room temperature to obtain a pigmented curable composition. The following test was carried out for the thus obtained curable composition.

For the storage stability, the composition was filled in a vessel made of polyethylene, left for two weeks under at 25°±2° C. and 65±5% RH and the state was observed. The setting time was measured according to JIS K 6861 using test pieces made of ABS resin.

For the curing time of the thin film, the composition was coated to a film thickness of 20 μm and then the time until the surface tackiness was eliminated was measured at of 25°±2° C. and 65±5% RH.

These results are shown Table 1.

EXAMPLES 2–5

Same tests were carried out for the compositions shown in Table 1 in the same manner as in Example 1. The results are shown in Table 1.

COMPARATIVE EXAMPLES 1–2

Same tests were carried out for the compositions shown in Table 1 in the same manner as in Example 1.

TABLE 1

| | Composition *1 | | | | |
|---|---|---|---|---|---|
| | 2-cyanoacrylate | Pigment powder | Acidic substance | Basic substance | Other |

TABLE 1-continued

| | | | | | |
|---|---|---|---|---|---|
| Example 1 | ethyl (84.4) | Fast Orange GRL (10) | chlorosulfonic acid (5000 ppm) | polyethylene glycol 1500 (1000 ppm) | polymethylmeth-acrylate (5) |
| Example 2 | ethyl (84.1) | Fast Orange GRL (10) | boron trifluoride-ether complex (8000 ppm) | polyethylene glycol 1500 (1000 ppm) | polymethylmeth-acrylate (5) |
| Example 3 | ethyl (92.6) | Fast Orange GRL (2) | trichloroacetic acid (3000 ppm) | 18-crown-5 (1000 ppm) | polymethylmeth-acrylate (5) |
| Example 4 | ethyl (88.4) | Red No. 2 aluminum lake (5) | p-toluene sulfonic acid (5000 ppm) | 18-crown-6 (1000 ppm) | polymethyl methacrylate (3) Aerosil R805 (3) |
| Example 5 | ethyl (88.6) | Red No. 2 aluminum lake (5) | boron trifluoride-ether complex (3000 ppm) | polyethylene glycol diacrylate (1000 ppm) | polymethyl methacrylate (3) Aerosil R805 (3) |
| Comparative example 1 | ethyl (90) | Fast Orange (5) | — | — | polymethyl methacrylate (5) |
| Comparative example 2 | ethyl (93) | Red No. 2 aluminum lake (2) | — | — | polymethyl methacrylate (5) |

| | Storage stability *2 | Setting time (ABS/ABS) | Thin film cure time |
|---|---|---|---|
| Example 1 | O | 120 sec. | 15 min. |
| Example 2 | O | 120 sec. | 15 min. |
| Example 3 | Δ | 15 sec. | 5 min. |
| Example 4 | Δ | 60 sec. | 10 min. |
| Example 5 | Δ | 30 sec. | 10 min. |
| Comparative example 1 | X | — | — |
| Comparative example 2 | X | — | — |

*1 All the units are based on % by weight unless other words specified.
*2 O: satisfactory;
Δ: viscosity increased;
X: cured

EXAMPLE 6

Silver powder was immersed for about 10 minutes in a methanol solution containing p-toluene sulfonic acid and γ-methacryloxypropyl trimethoxysilane each at 5% by weight, silver powder deposited with the solution was recovered by filtration and the solvent was removed in vacuum for about 10 hours to obtain silver powder brought into contact with the acid and the coupling agent.

The powder was added by 200 parts at weight to 100 parts by weight of ethyl 2-cyanoacrylate containing 2000 ppm of boron trifluoride-ethyl ether complex salt, 1000 ppm of polyethylene glycol 1500 and 5% by weight of polymethyl methacrylate and well kneaded at a room temperature to obtain an electroconductive curable composition. The following tests were carried for the thus obtained composition.

For the storage stability, the composition was filled in a vessel made of polyethylene, left for one month at 25°±2° C. at 65±5% RH and then the state was observed.

The setting time was measured according to JIS K 6861 using test pieces made of copper.

For the curing time of the thin film, the composition was coated to a film thickness of 20 μm and the time till the surface tackiness was eliminated was measured at 25°±2° C. and 65±5% RH.

The specific resistance value of the curing product was measured as the resistance value in the longitudinal direction of the curing product of 5 mm width × 50 μm thickness and 50 mm length one day after the coating. The results are shown in Table 2.

EXAMPLES 7-14

Same tests were carried out for the compositions shown in Table 2 in the manner as in Example 6. The results are shown in Table 2.

COMPARATIVE EXAMPLE 3

When 100 parts by weight of ethyl 2-cyanoacrylate were added to 100 parts by weight of silver powder, ethyl 2-cyanoacrylate instantly polymerized while generating heat failing to serve as the curing composition.

COMPARATIVE EXAMPLE 4

When 100 parts by weight of ethyl 2-cyanoacrylate were added to 200 parts by weight of silver power having been treated with a 5 wt % of solution of p-toluene sulfonic acid in methanol, kneaded sufficiently and the storage stability of the composition was observed, viscosity increase was resulted in one week and the composition was cured substantially completely after one hour failing to be used as the curing composition.

COMPARATIVE EXAMPLES 5–7

Same tests were carried for the compositions shown in Table 2 in the manner as in Example 6. The results are shown in Table 2.

TABLE 2

| | Composition | | | | Treatment for electrifying powder | |
|---|---|---|---|---|---|---|
| | Electroconductive powder | Acidic substance | Basic substance | Other | Acid | coupling agent |
| Example 6 | Silver (200 parts by weight) | boron trifluoride-ether complex (2000 ppm) | Polyethylene glycol 1500 (1000 ppm) | Polymethyl methacrylate (5 wt %) | p-toluene sulfonic acid *2 | γ-methacryloxy prolyltrimethoxy silane *2 |
| Example 7 | Silver (200 parts by weight) | boron trifluoride-ether complex (5000 ppm) | 18-crown-6 (1000 ppm) | polymethyl methacrylate (5 wt %) | none | none |
| Example 8 | Silver (100 parts by weight) | chlorosulfonic acid (5000 ppm) | triethlamine (5000 ppm) | — | hydrochloric acid *3 | γ-methacyloxy propyltrimethoxy silane *2 |
| Example 9 | Silver (100 parts by weight) | trifluoromethane sulfonic acid (2000 ppm) | polyethylene glycol 400 monolaurate (1000 ppm) | — | none | none |
| Example 10 | Silver (200 parts by weight) | Magic acid (5000 ppm) | polyvinyl pyrrolidone (2000 ppm) | polymethyl methacrylate (5 wt %) Aerosil R202 (5 wt %) | none | isopropyldimethacryl isosteararoyl titanate *4 |
| Example 11 | Silver (200 parts by weight) | boron trifluoride-methanol complex (5000 ppm) | dimethyl p-toluene (1000 ppm) | polymethyl methacrylate (5 wt %) Aerosil R202 (5 wt %) | p-toluene sulfonic acid *2 | γ-methacryloxy propyltrimethoxy silane *2 |
| Example 12 | Copper (100 parts by weight) | boron trifluoride - ether complex (5000 ppm) | polyethylene glycol 1500 (1000 ppm) | polymethyl methacrylate (5 wt %) | none | none |
| Example 13 | Copper (100 parts by weight) | chlorosulfonic acid (2000 ppm) | polyethylene glycol diacrylate (500 ppm) | polymethyl methacrylate (5 wt %) | p-toluene sulfonic acid *2 | none |
| Example 14 | Nickel coat aluminum powder (100 parts by weight) | chloro sulfonic acid (2000 ppm) | ethylene glycol-propylene glycol block copolymer (500 ppm) | — | none | none |
| Comparative example 5 | Silver (200 parts (by weight) | — | — | polymethyl methacrylate (5 wt %) Aerosil R202 (5 wt %) | p-toluene sulfonic acid *2 | γ-methacryloxy propyltrimethoxy silane *2 |
| Comparative example 6 | Silver (200 parts by weight) | boron trifluoride - ether complex (2000 ppm) | — | polymethyl methacrylate (5 wt %) | p-toluene sulfonic acid *2 | γ-methacryloxy propyltrimethoxy silane *2 |
| Comparative example 7 | Silver (200 parts by weight) | boron trifluoride - ether complex (5000 ppm) | — | polymethyl methacrylate (5 wt %) | none | none |

| | Storage stability *1 | Setting time (copper/ copper) | Thin film cure time | Specific resistance of curing product (Ω· cm) |
|---|---|---|---|---|
| Example 6 | O | 30 sec. | 5 min. | $1.7 \times 10^{-3}$ |
| Example 7 | Δ | 20 sec. | 3 min. | $3.5 \times 10^{-3}$ |
| Example 8 | O | 60 sec. | 10 min. | $2.8 \times 10^{-2}$ |
| Example 9 | Δ | 20 sec. | 5 min. | $3.5 \times 10^{-2}$ |
| Example 10 | O | 60 sec. | 15 min. | $4.1 \times 10^{-3}$ |
| Example 11 | O | 60 sec. | 15 min. | $3.2 \times 10^{-3}$ |
| Example 12 | Δ | 15 sec. | 5 min. | $7.2 \times 10^{-2}$ |
| Example 13 | O | 10 sec. | 5 min. | $1.2 \times 10^{-1}$ |
| Example 14 | Δ | 45 sec. | 15 min. | $5.4 \times 10^{-2}$ |
| Comparative | X | 20 sec. | 5 min. | $2.3 \times 10^{-3}$ |

TABLE 2-continued

|  |  |  |  |  |
|---|---|---|---|---|
| example 5 | | | | |
| Comparative example 6 | O | more than 3 min. | more than 30 min. | cured not completely |
| Comparative example 7 | Δ | more than 3 min. | more than 30 min. | cured not completely |

*1 O: satisfactory,
Δ: viscosity increased,
X: cured
*2 methanol solution (5 wt %)
*3 aqueous solution (2 wt %)
*4 trichloroethane solution (2 wt %)

What is claimed is:

1. A composition comprising a 2-cyanoacrylate ester containing from 10 to 400 parts by weight of the 2-cyanoacrylate of an electroconductive powder or a heat conductive powder; the electroconductive powder being selected from the group consisting of silver, copper, nickel, aluminum, gold, palladium, platinum, ruthenium, graphite, and mixtures thereof; the heat conductive powder being selected from the group consisting of silicon nitride, aluminum nitride, boron nitride, titanium nitride, sialon, silicon carbide, aluminum carbide, boron carbide, titanium carbide, aluminum oxide, glass fibers, boron oxide, aluminum, talc, silica, beryllin, clay, metal powders and mixtures thereof together with an electron acceptor or a coordination complex thereof selected from the group consisting of boron trifluoride and derivatives thereof, sulfonic acids, halogenated aliphatic carboxylic acids, antimony pentafluoride, phosphor hexafluoride, and mixtures thereof and a substantially equimolar amount of an electron donor selected from the group consisting of amines, crown-ethers, polyakylene glycol and derivatives thereof, fatty acid amides and mixtures thereof.

2. A curable composition as defined in claim 1, wherein the electron pair acceptor or the coordination complex thereof is selected from the group consisting of boron trifluoride, derivatives thereof and sulfonic acids.

3. A curable composition as defined in claim 2 wherein boron trifluoride, derivatives thereof and sulfonic acids are selected from the group consisting of boron trifluoro-acetic acid complex salt, boron trifluoride-ethyl ether complex salt, toluene sulfonic acids, trifluoromethane sulfonic acid or chlorosulfonic acid.

4. A curable composition as defined in claim 1 wherein the electron donor is selected from the group consisting of crown-ethers, polyalkylene glycols and the derivatives thereof.

5. A curable composition as defined in claim 4, wherein the crown-ether, polyalkylene glycol and the derivatives thereof are selected from the group consisting of 18-crown-6, polyethylene glycol, polyethylene glycol methyl ether, polyethylene glycol ethyl ether, polyethylene glycol acrylate, polyethylene glycol methacrylate, polypropylene glycol, polyethylene glycol 400 monolaurate, polyethylene glycol oleate, alkyl-polyethylene glycol thioether, ethylene glycol-propylene glycol block copolymer and oleyl polyethylene glycol ether.

6. A curable composition as defined in claim 4, wherein the crown-ether, polyalkylene glycol and the derivatives thereof are selected from the group consisting of 18-crown-6, polyethylene glycol, polyethylene glycol methyl ether, polyethylene glycol acrylate, polyethylene glycol methacrylate, ethylene glycol-propylene glycol block copolymer and oleyl polyethylene glycol ether.

* * * * *